April 16, 1929.　　W. M. WATKINS　　1,709,507
TRACE CARRIER
Filed June 11, 1928
FIG. 1.
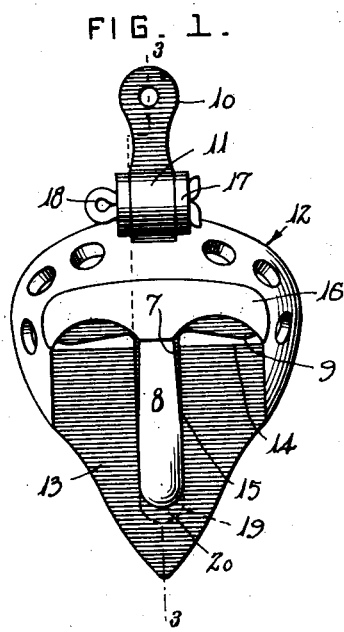
FIG. 2.
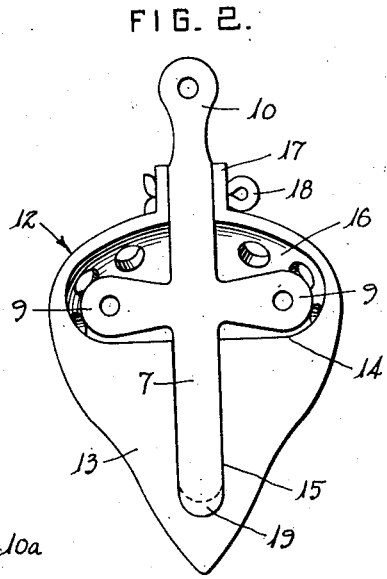
FIG. 4.
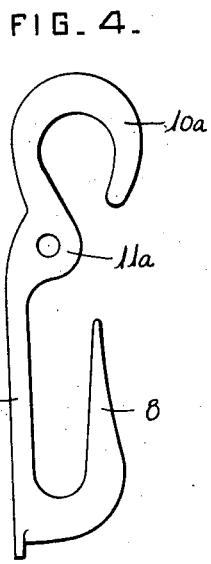
FIG. 3.
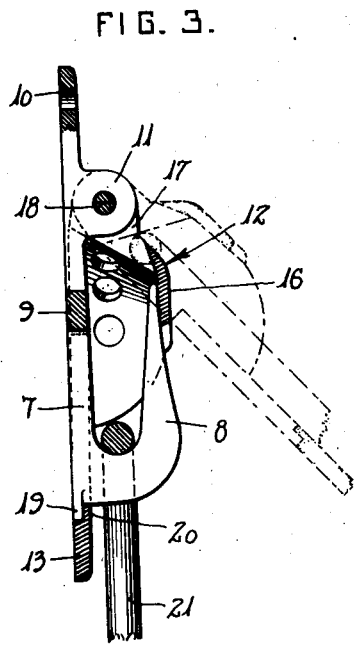
FIG. 5.
Inventor:
W. M. Watkins
By Monroe E. Miller
Attorney.

Patented Apr. 16, 1929.

1,709,507

UNITED STATES PATENT OFFICE.

WILLIAM M. WATKINS, OF LANCASTER, KENTUCKY, ASSIGNOR OF ONE-HALF TO GUY H. WATKINS, OF LANCASTER, KENTUCKY.

TRACE CARRIER.

Application filed June 11, 1928. Serial No. 284,649.

The present invention relates to trace carriers, and aims to provide a novel and improved device of that kind which will enable the trace to be readily connected with and disconnected from the carrier, without the possibility of accidental disconnection, and the parts being protected when assembled.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a front view of the improved trace carrier.

Fig. 2 is a rear view thereof.

Fig. 3 is a section on the line 3—3 of Fig. 1.

Fig. 4 is a side elevation of a modified form of hook member.

Fig. 5 is a front view of another modified form of hook member.

Referring to Figs. 1, 2 and 3, the trace carrier comprises a hook member having the vertical shank 7 with the upturned bill 8 in front thereof, and the shank 7 has the lateral apertured lobes 9 between its ends and the apertured lobe 10 at its upper end, to fasten the hook member to the harness by means of rivets or other securing elements.

The shank 7 is provided above the bill 8 with an outstanding apertured lug 11 to which is pivoted a guard or shield 12 comprising the plate 13 having the opening 14 to receive the lobes 9 and having the slot 15 extending downwardly from said opening to receive the shank 7. The plate 13 is provided with a hood 16 in front of the opening 14, and having upstanding ears 17 straddling the lug 11 and hinged to said lug by means of the pivot element 18.

The shield 12 may thus swing forwardly and rearwardly about the pivot element 18, and the shank 7 has a lip 19 projecting from its lower end for the contact of the portion 20 of the plate 13, when said shield is swung rearwardly to its normal position, in which event the forward depending portion of the hood 16 overlaps the upper terminal of the bill 8.

In order to move the link 21 of the trace supporting chain or other trace supporting element over the bill 8, the shield 12 must be swung outwardly and upwardly, as shown in dotted lines in Fig. 3, which enables the link or element 21 to be moved under the hood 16 in front of the plate 13 to move over the bill 8, either for moving the link into or out of the hook. When the link 21 is moved into the hook so as to seat on the lower portion of the bill 8, as seen in full lines in Fig. 3, with the shield 12 in normal position, the link 21 holds the plate 13 in place, and the link 21 cannot become accidentally detached. The hood 16 overlaps the bill 8, to close the hook, and in order to detach the link 21, said link must be raised and the shield 12 swung outwardly and upwardly with the link, which is not apt to happen accidentally.

The hook 16 also protects the hook to prevent the hook from catching into other objects.

As shown in Fig. 4 the shank 7ª of the hook member has the apertured lug 11ª to which the shield 12 may be hinged, and above said lug the shank has a hook 10ª to connect with the harness. This hook 10ª may be used in lieu of the lobes 9 and 10, and Fig. 5 shows the shank 7ᵇ of the hook member as having a transverse loop 10ᵇ at its upper end to engage in the loop of a strap, or the like. Various means of attachment for the hook member may therefore be used. With the use of the hook 10ª, same may be engaged through a ring, loop, or the like, and then bent closed.

Having thus described the invention, what is claimed as new is:—

A trace carrier comprising a hook member having a depending shank with an upturned bill in front of the shank, and a shield hingedly connected with said member at the upper end of the shank and having a plate to be normally disposed in the plane of said shank, said plate having a slot to receive the shank, and said shield having a hood to overlap the terminal of said bill, said hood extending downwardly in front and at the opposite sides of the bill and limiting the upward movement of a link engaging said bill.

In testimony whereof I hereunto affix my signature.

WILLIAM M. WATKINS.